US008369631B2

(12) United States Patent
Henry

(10) Patent No.: US 8,369,631 B2
(45) Date of Patent: Feb. 5, 2013

(54) METHODS AND DEVICES FOR CODING AND DECODING, A TELECOMMUNICATION SYSTEM AND COMPUTER PROGRAM IMPLEMENTING THEM

(75) Inventor: Felix Henry, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 931 days.

(21) Appl. No.: 12/438,044

(22) PCT Filed: Sep. 18, 2007

(86) PCT No.: PCT/IB2007/003756
§ 371 (c)(1),
(2), (4) Date: Feb. 19, 2009

(87) PCT Pub. No.: WO2008/035223
PCT Pub. Date: Mar. 27, 2008

(65) Prior Publication Data
US 2010/0054613 A1    Mar. 4, 2010

(30) Foreign Application Priority Data

Sep. 18, 2006 (FR) ...................................... 06 53783

(51) Int. Cl.
G06K 9/36    (2006.01)

(52) U.S. Cl. .................................................... 382/232
(58) Field of Classification Search .......... 382/232–233, 382/236, 238–240, 248; 348/240.02, 240.12–240.19; 375/394.1, 375/398.1, 400.1–416.1
See application file for complete search history.

(56) References Cited

U.S. PATENT DOCUMENTS

| 5,956,427 | A | * | 9/1999 | Greenspan et al. | 382/240 |
| 5,978,517 | A | | 11/1999 | Henry et al. | 382/253 |
| 5,995,027 | A | | 11/1999 | Henry | 341/50 |
| 6,122,017 | A | * | 9/2000 | Taubman | 348/620 |
| 6,215,422 | B1 | | 4/2001 | Henry et al. | 341/51 |
| 6,333,705 | B1 | | 12/2001 | Amonou et al. | 341/107 |
| 6,381,279 | B1 | * | 4/2002 | Taubman | 375/240.18 |
| 6,498,866 | B2 | | 12/2002 | Charrier et al. | 382/248 |

(Continued)

FOREIGN PATENT DOCUMENTS

WO    WO 2004/056120 A1    7/2004

OTHER PUBLICATIONS

Sobel Edge Detector, http://homepages.inf.ed.ac.uk/rbf/HIPR2/sobel.htm (last visited Aug. 12, 2009).

(Continued)

*Primary Examiner* — Jose Couso
(74) *Attorney, Agent, or Firm* — Fitzpatrick, Cella, Harper & Scinto

(57) ABSTRACT

The method of coding a multidimensional digital signal, said signal comprising a plurality of samples denoted "initial", characterized in that it comprises: —a step of determining at least one secondary signal representing said multidimensional digital signal, each secondary signal having a lower number of samples than the number of samples of the multidimensional digital signal; —a step of determining filtering orientations on the basis of at least one secondary signal and—a step of determining at least one tertiary signal representing the signal to code, each tertiary signal having a lower number of samples than the number of initial samples, by implementing, on said multidimensional digital signal, filtering that is oriented on the basis of said filtering orientations.

23 Claims, 6 Drawing Sheets

U.S. PATENT DOCUMENTS

| | | | |
|---|---|---|---|
| 6,501,860 B1 | 12/2002 | Charrier et al. | 382/240 |
| 6,546,143 B1* | 4/2003 | Taubman et al. | 382/240 |
| 6,631,213 B1 | 10/2003 | Amonou et al. | 382/232 |
| 6,778,608 B1 | 8/2004 | Berthelot et al. | 375/240.18 |
| 6,795,577 B2* | 9/2004 | Amonou | 382/173 |
| 6,801,666 B1 | 10/2004 | Henry et al. | 382/240 |
| 7,027,656 B2 | 4/2006 | Henry et al. | 382/239 |
| 7,088,858 B2 | 8/2006 | Henry | 382/173 |
| 7,315,648 B2 | 1/2008 | Henry | 382/173 |
| 7,379,626 B2* | 5/2008 | Lachine et al. | 382/300 |
| 7,460,722 B2 | 12/2008 | Henry | 382/239 |
| 7,463,782 B2 | 12/2008 | Fuchs et al. | 382/248 |
| 7,477,790 B2 | 1/2009 | Henry | 382/233 |
| 7,565,020 B2* | 7/2009 | Wu et al. | 382/238 |
| 7,567,716 B2 | 7/2009 | Henry et al. | 382/232 |
| 7,751,621 B1* | 7/2010 | Jacobsen | 382/173 |
| 7,792,390 B2* | 9/2010 | Prakash et al. | 382/302 |
| 8,050,503 B2* | 11/2011 | Dekel et al. | 382/209 |
| 2005/0053299 A1 | 3/2005 | Fuchs et al. | 382/239 |
| 2005/0100224 A1 | 5/2005 | Henry et al. | 382/232 |
| 2006/0050789 A1 | 3/2006 | Gisquet et al. | 375/240.23 |
| 2008/0130736 A1 | 6/2008 | Onno et al. | 375/240.01 |
| 2008/0172434 A1 | 7/2008 | Henry | 708/308 |
| 2008/0226185 A1 | 9/2008 | Henry | 382/240 |

OTHER PUBLICATIONS

Predict Wavelets: wavelets viewed as compression, www.bearcave.com/misl/misl_tech/wavelets/lifting/predict.html (last visited Aug. 12, 2009).

Taubman, D., et al., "Orientation Adaptive Subband Coding of Images", Proc. of the Int'l Symposium on Circuits and Systems (ISCAS), Chicago, vol. 2, May 3-6, 1993, pp. 271-274.

Velisavljevic, V., et al., "Approximation Power of Directionlets", IEEE Int'l Conference on Image Processing (ICIP), Genova, Italy, Sep. 11-14, 2005, pp. 741-744.

Vetterli, M., "Wavelets, Approximation, and Compression", IEEE Signal Processing Magazine, vol. 18, No. 5, Sep. 2001, pp. 59-73.

da Cunha, A.L., et al., "Nonsubsampled Contourlet Transform: Filter Design and Applications in Denoising", IEEE Int'l Conference on Image Processing (ICIP), Genova, Italy, Sep. 11-14, 2005, pp. 749-752.

* cited by examiner

METHODS AND DEVICES FOR CODING AND DECODING, A TELECOMMUNICATION SYSTEM AND COMPUTER PROGRAM IMPLEMENTING THEM

The present invention concerns a coding method and device, a decoding method and device, a computer program implementing those methods and an information carrier enabling the implementation of such methods.

The present invention generally concerns the digital processing of signals, and, more particularly, the compression and decompression of multidimensional digital signals, in particular signals representing fixed or moving images.

In the case, for example, of a digital camera, a digital image is constituted by a set of N×M pixels (portmanteau word from "picture element"), where N is the height of the image and M the width of the image, in pixels. The image is generally coded before being stored in memory. The initial data, that is to say the information representing the pixels of the image, are organized in a bidimensional array, which is, for example accessible row by row.

However, prior to its coding, a digital image undergoes a transformation consisting of apply filtering to the whole or part of a digital image. Reciprocally, after the decoding of a coded digital image, the image undergoes a transformation that is inverse to the filtering applied before the coding. The filtering implemented during the initial transformation is a convolution integral between the image signal and a predetermined vector enabling, for each pixel of the region to which it applies, its value to be modified on the basis of the values of the neighboring pixels, to which coefficients or weightings are allocated.

A filtering technique is known, in particular from the document WO 2004056120, enabling the quantity of information contained in the frequency sub-bands of an image to be reduced. This technique relies on the technique of decomposition into bandelets. Using decomposition into bandelets for filtering an image, the signal is first of all analyzed so as to detect local regularities in the bitstream. More particularly, the parts of the signal with a homogenous bitstream are isolated and filtered taking into account the direction of the bitstream. Thus, the filtering generates a signal which contains less information than the unfiltered signal and the ensuing compression is more effective.

However, this technique requires a high number of calculations. This is because it is necessary to analyze the signal in order to identify the parts having a homogenous bitstream, which is a complex operation.

Furthermore, this technique does not enable separability, which is the capacity of a filter to be applied, independently, to the different dimensions of the signal, for example, along the rows and along the columns, or vice-versa.

It is one of the aims of the present invention to optimize the compression-distortion compromise for the coding of a multidimensional signal.

The present invention concerns, in particular, increasing the compression rate at equivalent quality, or, conversely, increasing the quality of the image at the same compression rate.

To that end, the present invention concerns, according to a first aspect, a method of coding a multidimensional digital signal, said signal comprising a plurality of samples denoted "initial", which comprise:
 a step of determining at least one secondary signal representing said multidimensional digital signal, each secondary signal having a lower number of samples than the number of samples of the multidimensional digital signal;
 a step of determining filtering orientations on the basis of at least one secondary signal and
 a step of determining at least one tertiary signal representing the signal to code, each tertiary signal having a lower number of samples than the number of initial samples, by implementing, on said multidimensional digital signal, filtering that is oriented on the basis of said filtering orientations.

By virtue of these provisions for reconstructing the multidimensional digital signal on the basis of the secondary signal and tertiary signal or signals, there is no need for the information representing the filtering directions applied on coding to be transmitted, since the determination of orientations may, once again, be carried out on the secondary signal. The coding method of the present invention thus gives a good compression rate/image quality compromise.

According to particular features, during the step of determining a secondary signal, a simple downsampling operation is applied to the multidimensional signal.

By virtue of these provisions, little resources are consumed to generate the secondary signal enabling determination of the orientations to apply.

According to particular features, during the step of determining a secondary signal, a low-pass filter and a downsampling operation are applied to the multidimensional signal.

By virtue of these provisions, the quality of the determination of the orientations to apply is improved by the use of the low-pass filter.

According to particular features, during the step of determining at least one tertiary signal, for each tertiary signal, a high-pass filter and a downsampling operation are applied to the multidimensional digital signal.

The compression rate obtained is thus improved.

According to particular features, the coding method as succinctly set forth above comprises a step of coding the tertiary signals.

By virtue of these provisions, the tertiary signals can be stored and/or transmitted.

According to particular features, during the steps of determining at least one secondary signal and of determining at least one tertiary signal, a decomposition into frequency sub-bands is implemented by applying filtering to the multidimensional signal to generate sub-bands corresponding to different frequencies.

By virtue of these provisions, the compression rate obtained is increased.

According to particular features, said decomposition into frequency sub-bands employs the "lifting" technique.

The quantity of memory used to implement the coding method is thus reduced since, in the "lifting" technique, one of the values is replaced by other in the memory.

According to particular features, during the step of determining filtering orientations on the basis of at least one secondary signal, the secondary signal is reconstructed by implementing a coding and decoding simulation and the result of that simulation is used in order to obtain a version of the secondary signal that is identical to that available on decoding.

By virtue of these provisions, the orientations determined on coding and on decoding are identical, which avoids any difference liable to cause errors.

According to particular features, during the step of determining filtering orientations on the basis of at least secondary signal, a step of detecting the edge orientation of the secondary signal is applied.

By virtue of these provisions, the filtering output amplitude is reduced due to the fact that it is oriented parallel to the edges of the image.

According to a second aspect, the present invention concerns a device for coding a multidimensional digital signal, said signal comprising a plurality of samples denoted "initial", which comprise:

- means for determining at least one secondary signal representing said multidimensional digital signal, each secondary signal having a lower number of samples than the number of samples of the multidimensional digital signal;
- a means for determining filtering orientations on the basis of at least one secondary signal and
- a means for determining at least one tertiary signal representing the signal to code, each tertiary signal having a lower number of samples than the number of initial samples, by implementing, on said multidimensional digital signal, filtering that is oriented on the basis of said filtering orientations.

According to a third aspect, the present invention concerns a method of decoding data of a coded multidimensional digital signal representing coded samples, which comprises:

- a step of determining at least one secondary signal representing the data of the coded multidimensional digital signal, each secondary signal having a lower number of samples than the number of coded samples,
- a step of determining filtering orientations on the basis of at least one secondary signal,
- a step of decoding at least one tertiary signal representing the data of the coded multidimensional digital signal, each tertiary signal having a lower number of samples than the number of initial samples and
- a step of determining a quaternary signal representing the coded signal, on the basis of at least one tertiary signal, by implementing filtering oriented on the basis of said filtering orientations.

According to particular features, during the step of determining at least one secondary signal, the data of the coded multidimensional digital signal are decoded.

According to particular features, said quaternary signal is implemented, as new secondary signal, in an iteration of the steps of said method.

According to particular features, during each step of determining a quaternary signal, a simple upsampling operation is applied to at least one secondary signal.

According to particular features, during each step of determining a quaternary signal, a low-pass filter and an upsampling operation are applied to at least one secondary signal.

According to particular features, during each step of determining a quaternary signal, a recomposition into frequency sub-bands is implemented, on the basis of at least one secondary signal and at least one tertiary signal.

According to particular features, said recomposition into frequency sub-bands employs the "lifting" technique.

According to particular features, during the step of determining filtering orientations on the basis of at least one secondary signal, a step of detecting the orientation of edges of the secondary signal is applied.

According to a fourth aspect, the present invention concerns a device for decoding data of a coded multidimensional digital signal representing coded samples, which comprises:

- a means for determining at least one secondary signal representing the data of the coded multidimensional digital signal, each secondary signal having a lower number of samples than the number of coded samples,
- a means for determining filtering orientations on the basis of at least one secondary signal,
- a means for decoding at least one tertiary signal representing the data of the coded multidimensional digital signal, each tertiary signal having a lower number of samples than the number of initial samples and
- a means for determining a quaternary signal representing the coded signal, on the basis of at least one tertiary signal, implementing filtering oriented on the basis of said filtering orientations.

According to a fifth aspect, the present invention concerns a computer program loadable into a computer system, said program containing instructions enabling the implementation of the coding method and/or the implementation of the decoding method as succinctly set forth above, when that program is loaded and executed by a computer system.

According to a sixth aspect, the present invention concerns an information carrier readable by a computer or a microprocessor, removable or not, storing instructions of a computer program, characterized in that it enables the implementation of the coding method as succinctly set forth above and/or the implementation of the decoding method as succinctly set forth above.

As the advantages, objectives and characteristics of this decoding method, of this coding device, of this decoding device, of this computer program and of this information carrier are similar to those of the coding method, as succinctly set forth above, they are not repeated here.

Other advantages, objectives and features of the present invention will emerge from the following description, given, with an explanatory purpose that is in no way limiting, with respect to the accompanying drawings in which.

Before describing the features of the methods and devices of the present invention, a description will be given with reference to FIG. 1, of the successive steps of an image compression and transmission. These steps may be implemented by a device of the present invention, for example as described in FIG. 6.

Figure 1:
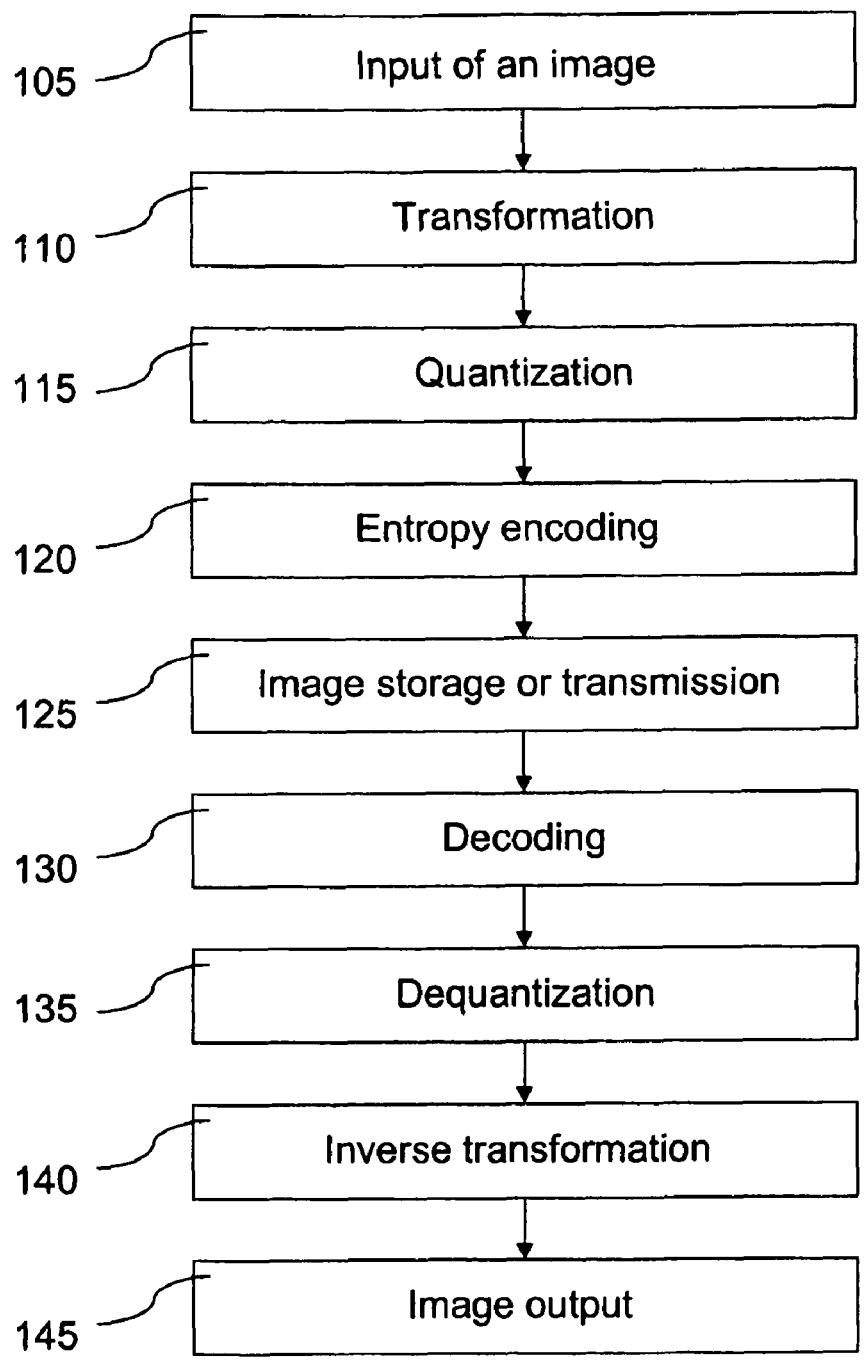
FIG. 1 is a representation, in the form of a logigram, of the image coding, transmission and decoding method steps.

First of all, in FIG. 1, a step 105 is observed of inputting a digital image adapted to be compressed for storage or transmission. This step 105 may, according to the applications of the present invention, be carried out by loading an image file from a memory or from a computer network or by image capture, for example by a digital camera or by a digital camcorder.

The image is then filtered, during a filtering step 110, to obtain a filtered image formed of selected filtered samples, preferably associated with information representing filters. Step 110 is detailed with reference to FIG. 3, in a particular embodiment of the coding method of the present invention.

Next, the filtered image is quantized, during a quantization step 115, then coded during an entropy encoding step 120, according to techniques known per se. The image thus compressed is stored in memory or transmitted, this second case being illustrated by step 125.

After reception, and possibly storage in memory, the coded image received successively undergoes a step of entropy decoding 130, of dequantization, for inverse quantization, 135 and of transformation that is inverse to the transformation carried out during step 110, during step 140 detailed with reference to FIG. 4. The image obtained at the end of these steps is the decompressed image which is output, for example to be stored or displayed, during a step 145.

Generally, the present invention makes it possible to code a digital signal with several dimensions. In the preferred embodiment described with reference to the drawings, the coding and the decoding are applied to a fixed digital image, which is a bidimensional signal. However, the present invention applies similarly to the signals which have a higher number of dimensions, for example the signals representing a video (3 dimensions).

In the preferred embodiment, filtering is used that performs a decomposition into frequency sub-bands aimed at compressing the digital image. This is because it is known to use such filtering, also termed wavelet decomposition, for example in the JPEG2000 standard.

Figure 2:
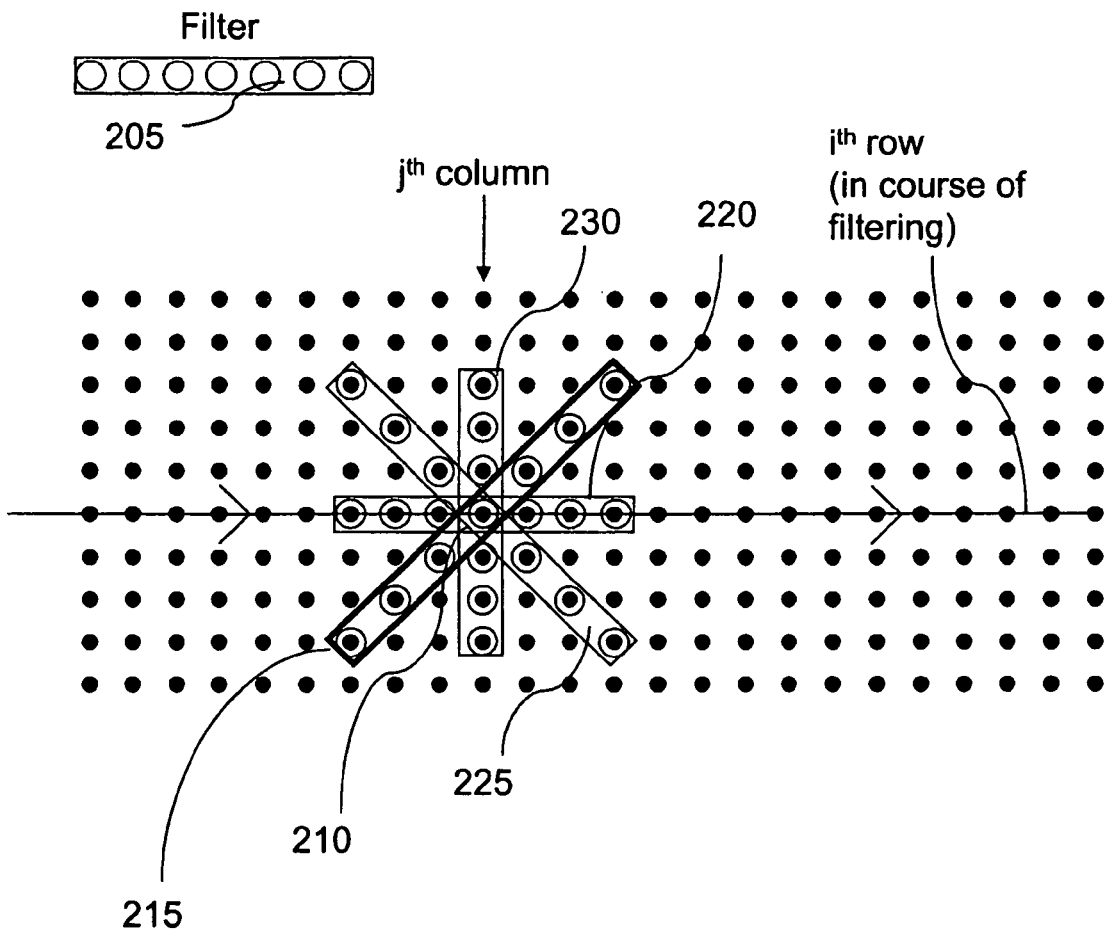
FIG. 2 is a diagram of a filtering operation according to several geometric orientations employed in the coding method illustrated in FIG. 1.

However, the embodiment of the present invention described with reference to the Figures differs from the filtering as used in JPEG2000 since the filters used may be oriented, as illustrated in FIG. 2, described with reference to step 335 represented in FIG. 3. The orientation of each filtering operation is determined on the basis of information available on decoding, and it is thus not necessary to transmit that orientation to the decoding device, which, at equal quality, makes it possible to increase the compression rate or, at equal compression rate, reduce the differences between the image to code and the image that is compressed and then decomposed.

Figure 3:
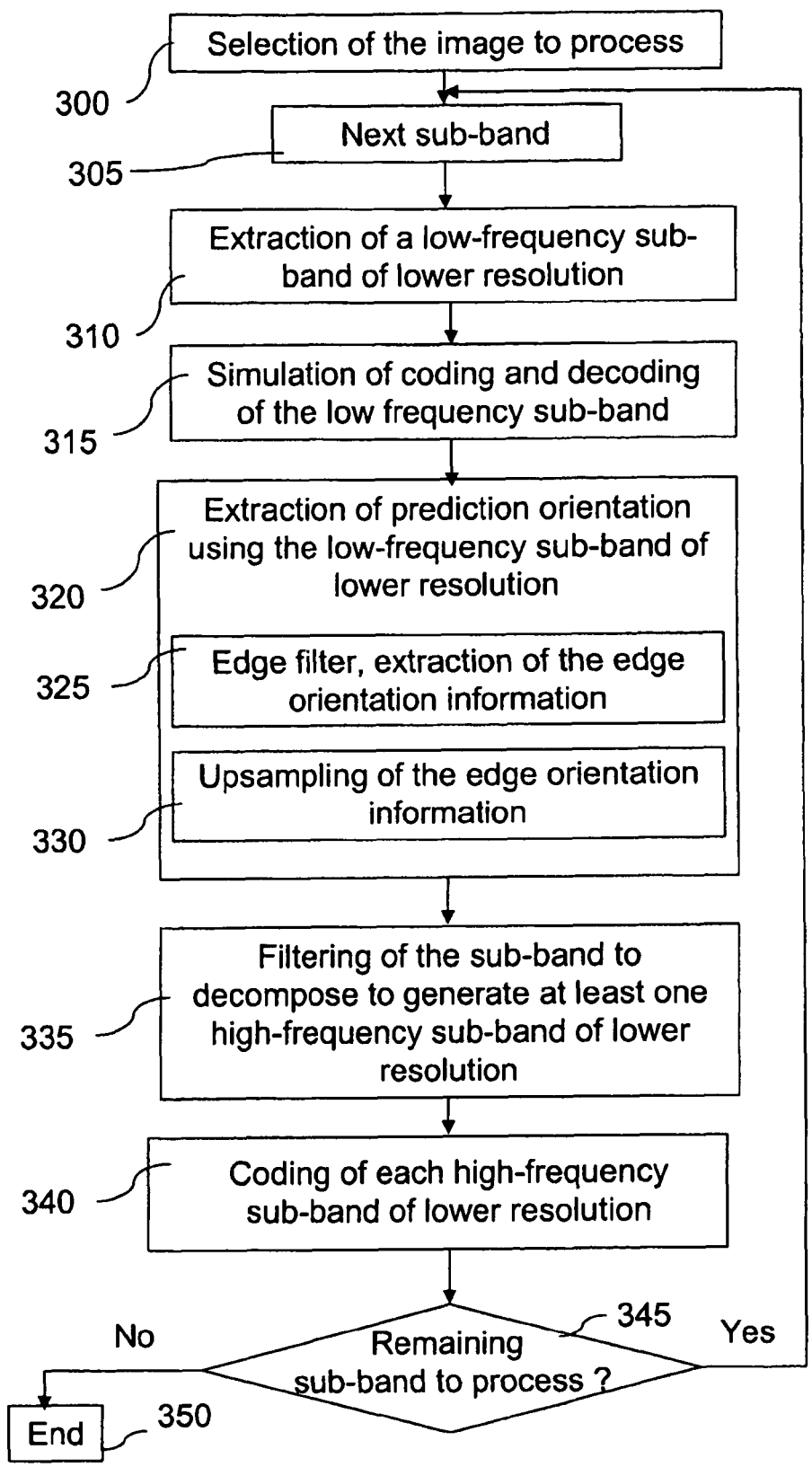
FIG. 3 is a representation, in the form of a logigram, of the steps implemented in a particular embodiment of the coding method of the present invention.

The coding steps are represented in FIG. 3. During a step 300, selection is made of the image, or the multidimensional digital signal, to process. Next, during a step 305, selection is made of a sub-band to decompose.

Figure 5:
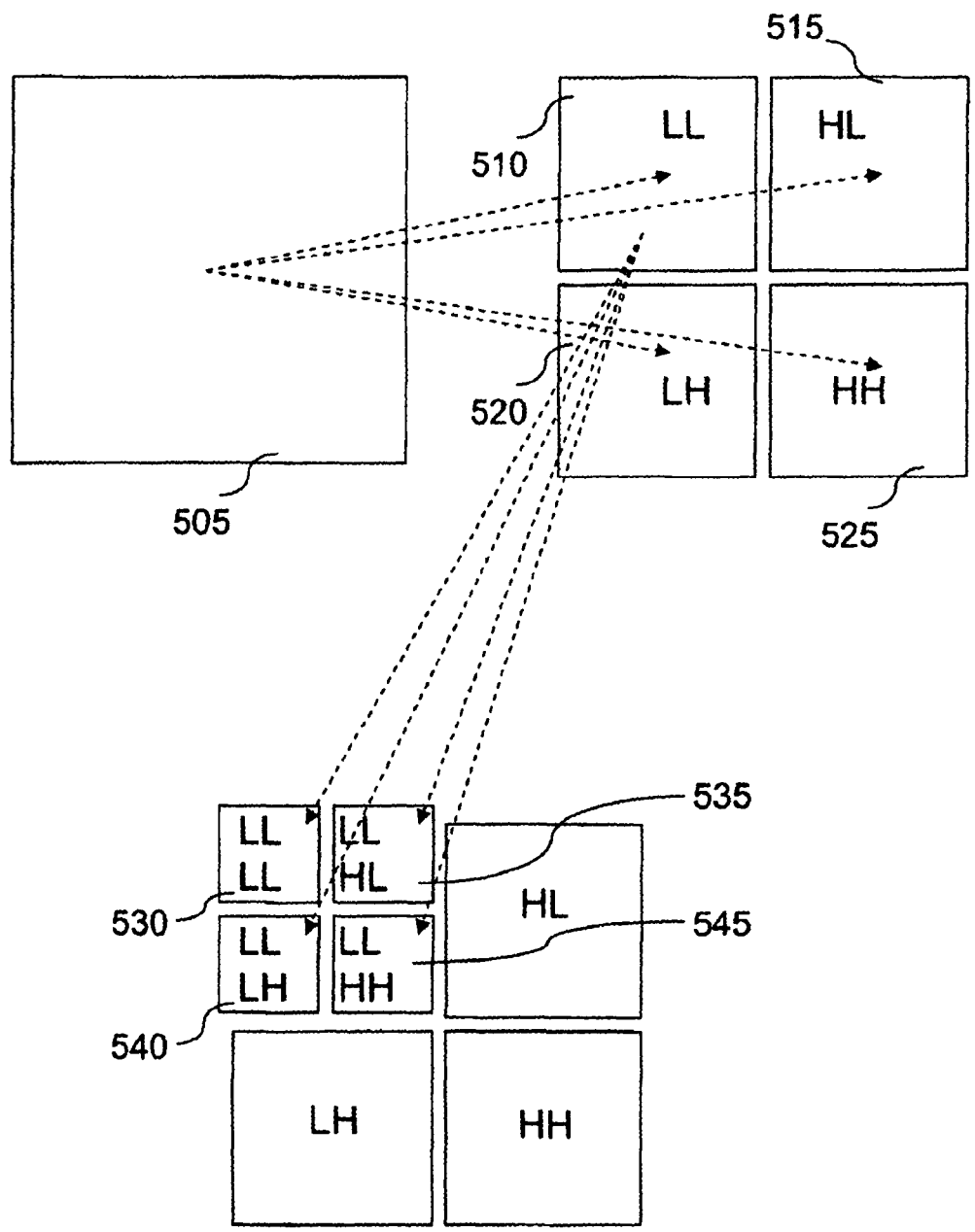
FIG. 5 is a diagram of examples of sub-bands of an image in course of being processed by the coding method of the present invention and FIG. 6 is a diagram of a particular embodiment of the devices and of the system of the present invention.

If the initial image has not yet been decomposed into sub-bands, the initial image is considered as the sub-band to decompose. If sub-bands have already been produced, the sub-band selected during step 305 is the first sub-band, of low frequency, from the next resolution, until a predetermined number of resolutions have been processed, for example three, as illustrated in FIG. 5 by the sub-bands 505, 510 and 530.

As a variant, if sub-bands have already been produced, that is to say if the initial image has already been decomposed into sub-bands, the sub-band selected during step 305 is, in the case in which the last sub-band of a resolution has not yet been processed, the next sub-band in the same resolution and, in the case in which the last sub-band of a resolution has been processed and at least one resolution remains to be processed, the first low-frequency sub-band of the next resolution.

Filtering into sub-bands consists of applying filtering to an original signal in order to generate one or more sub-bands corresponding to different frequencies. The set of these sub-bands correspond to a given resolution. It is thus common to select one or more of these sub-bands in order once again to decompose them into sub-bands, which will then constitute the next resolution. This process may be reiterated a certain number of times.

Thus, during the step 305, the initial image is first of all selected and it is considered as a sub-band to filter. At the time of the following iterations, the sub-band to decompose is a sub-band obtained at the time of a decomposition carried out already. The resolution of the selected sub-band is designated R0 (the resolution is the number of samples per spatial unit and in the case of an image, per unit area) and the selected sub-band S0.

During a step 310, a secondary signal is determined constituted by a low-frequency sub-band of lower resolution than the resolution of the sub-band selected during step 305. Step 310 consists of extracting a sub-band of resolution R1 lower than R0, corresponding to low-frequency filtering of S0. In the preferred embodiment, the sub-band of resolution R0 is downsampled by a factor of 2 in each dimension. As S0 is the sub-band of resolution R0, and as $S0(x,y)$ is the sample situated at the coordinates (x,y), the extracted low-frequency sub-band SBE1 of resolution R1 is given by:

$$SBE1(x,y)=S0(2*x,2*y).$$

As a variant, the determination of the sub-band carried out during step 310 employs one of the calculations that is more complex than a simple downsampling operation. For example, this sub-band determination associates a downsampling operation and a low pass filtering operation, similar to the low pass filtering used in JPEG2000.

During a step 315, a simulation of coding and of decoding is carried out. It is noted that step 315 is optional. In particular, it is not necessary in the case of non-lossy compression of the signal. On the other hand, step 315 is recommended if lossy coding of the signal is carried out. During step 315, simulation is made of a coding and of a decoding operation of the sub-band SBE1, so as to generate a new secondary signal, the sub-band SBED1 which is similar to SBE1 but which comprises possible errors due to the coding and decoding.

This simulation of coding-decoding comprises, for example, the following steps:
division into sub-bands,
quantization,
entropy coding,
entropy decoding,
dequantization and
combination of the sub-bands.

It will be noted that the coding-decoding may, itself, implement the characteristic steps of the coding method of the present invention.

Next, during a step 320, filtering orientation determination is carried out. During this step 320, use is made of the secondary signal constituted by the sub-band SBED1 or the sub-band SBE1 if step 315 has not been applied, to determine the filtering orientations to use to generate the high-frequency sub-bands of the same resolution as SBE1. Different approaches are possible. In the preferred embodiment, during a step 325, the orientation is extracted of the edges of the secondary signal, for example by Sobel filtering, well known to the person skilled in the art (see http://homepages.inf.ed.ac.uk/rbf/HIPR2/sobel.htm) and which consists of applying two bidimensional filtering operations to the image represented by that secondary signal. The arctangent of the ratio of the outputs of these two filtering operations gives the local orientation of the edge. An image which, for each sample of the secondary signal, contains the orientation of the local edge, is thus created. This image is termed SO1. The Sobel filtering operation gives the orientation of the orthogonal to the local edge. In the preferred embodiment, 90° is added to the result to obtain the orientation of the actual edge, which is assimilated to the orientation of its tangent and the geometric orientation of the filter closest to the orientation obtained is taken.

In variants, during the step 320, filtering is used other than that of Sobel (see http://homepages.inf.ed.ac.uk/rbf/HIPR2/sobel.htm) such as Robert Cross edge detection filtering.

The image SO1 is upsampled during a step 330, to produce the image of the orientations SO0. In the downsampling example given above, the upsampling consists of increasing the number of samples per unit length by a factor of two in each dimension. The added samples are constructed by duplicating the samples of SO1 or by filtering.

During a step 335, the filtering is carried out of the sub-band to decompose, or original sub-band, to generate at least one tertiary signal composed of a high frequency sub-band of lower resolution. In the preferred embodiment described with reference to the drawings, the decomposition of the sub-band to decompose provides three tertiary signals or high-frequency sub-bands, according to the technique known as "lifting", but by employing as filtering geometric orientation the orientation provided, for each sample processed, during step 320.

During the step 335, determination is made of the filter or filters to apply. In the preferred way of implementing of the present invention, two filters are successively applied, in the horizontal and vertical dimensions of the image and, for each of these dimensions, one of the following two filters is applied.

A first filter, termed "high-pass" filter, extracts the high frequencies of the signal. For example, the result of the filtering of a mono-dimensional signal $\{\ldots, x_{i-3}, x_{i-2}, x_{i-1}, x_i, x_{i+1}, x_{i+2}, x_{i+3}, \ldots\}$ by the high-pass filter of which the coefficients are $[1/16, 0, -9/16, 1, -9/16, 0, 1/16]$ is $$yi = x_{i-3}/16 - 9 \cdot x_{i-1}/16 + x_i - 9 \cdot x_{i+1}/16 + x_{i+3}/16.$$

It is noted that this filtering is followed by downsampling by a factor of two.

A second filter, termed "low-pass" filter, extracts the low frequencies of the signal. For example, the result of the filtering of a mono-dimensional signal $\{\ldots, x_{i-3}, x_{i-2}, x_{i-1}, x_i, x_{i+1}, x_{i+2}, x_{i+3}, \ldots\}$ by the low-pass filter of which the coefficients are $[-1/16, 0, 5/16, 1, 5/16, 0, -1/16]$ is $$yi = -x_{i-3}/16 + 5 \cdot x_{i-1}/16 = x_i + 5 \cdot x_{i+1}/16 - x_{i+x}/16.$$

It is noted that these filters are the filters used in the "lifting scheme" decomposition which is known (see, for example, http://www.bearcave.com/misl/misl_tech/wavelets/lifting/predict.html) and is particularly adapted to the invention.

The current filter 205 is illustrated in FIG. 2, which attributes coefficients to the values of seven samples and which is applied to a multidimensional signal to replace the value of a sample 210 with the result of the application of that filter 205 to the sample 210. In the example represented, the current sample 210 is that corresponding to the $i^{th}$ row and the $j^{th}$ column.

In the embodiment illustrated in FIG. 2, four geometric orientations 215, 220, 225 and 230 of the filter 205 are possible and represented. By denoting the coefficient of the row number i and of the column number j as $x_{i,j}$, these four orientations correspond to the filtering of the following mono-dimensional signals.

$\{x_{i-3,j-3}, x_{i-2,j-2}, x_{i-1,j-1}, x_i, x_{i+1,j+1}, x_{i+2,j+2}, x_{i+3,j+3}\}$
$\{x_{i,j-3}, x_{i,j-2}, x_{i,j-1}, x_{i,j}, x_{i,j+1}, x_{i,j+2}, x_{i,j+3}\}$
$\{x_{i+3,j-3}, x_{i+2,j-2}, x_{i+1,j-1}, x_i, x_{i-1,j+1}, x_{i-2,j+2}, x_{i-3,j+3}\}$
$\{x_{i-3,j}, x_{i-2,j}, x_{i-1,j}, x_{i,j}, x_{i+1,j}, x_{i+2,j}, x_{i+3,j}\}$ which correspond respectively to orientations of 45°, 0°, −45° and 90°. Only one of these four orientations, provided by the image of the orientations SO0, serves to really filter the multidimensional signal.

It is noted that, in the preferred embodiment, there are eight possible orientations corresponding to angles uniformly distributed between −90° and 90°, when the coefficients of the filter 205 are asymmetrical and four when those coefficients are symmetrical.

The geometric orientation used for each sample of the selected sub-band S0 is given by the image of the orientations SO0: by filtering the sample of the selected sub-band S0 situated at the coordinates (x,y), the predetermined orientation is used which is the closest to $SO0(x,y)$.

On processing a resolution of a digital image which is a signal with two dimensions, this filtering is reiterated three times to generate the three tertiary signals or sub-bands said to be high-frequency, corresponding to:

a high-frequency filtering operation by going through the samples along the horizontal axis (row by row) then a low-frequency filtering operation by going through the samples along the vertical axis (column by column), a low-frequency filtering operation by going through the samples along the horizontal axis (row by row) then a high-frequency filtering operation by going through the samples along the vertical axis (column by column), a high-frequency filtering operation by going through the samples along the horizontal axis (row by row) then a high-frequency filtering operation by going through the samples along the vertical axis (column by column).

In the case of the filtering of the original sub-band S0, three new high-frequency sub-bands are thus produced, as in the conventional wavelet transform.

During a step 340, coding is carried out of the three tertiary signals or high-frequency sub-bands generated earlier, in a conventional manner, for example by scalar quantization or vector quantization, followed by entropy coding such as Huffman coding or arithmetic coding.

As a variant, not only are the three high-frequency sub-bands coded, but also the low-frequency sub-band which constitutes the secondary signal.

During a step 345, it is determined whether at least one sub-band to process remains. If the number of resolutions desired has been attained and the last sub-band to process of that resolution has been processed, the process is terminated. Otherwise, the step 305 of selecting the sub-band to decompose is returned to.

It is noted that, although several types of high-pass filters, several types of low-pass filters or several sets of filter coefficients may be used for those filters, an item of information is associated with each set of samples, for example a sub-band, to identify that one or those ones of the filters which have actually been used for the coding of that set of samples.

Thus, as illustrated in FIG. 5, an image 505 (first resolution) is, first of all, decomposed into four sub-bands 510, 515, 520 and 525 (second resolution), then the sub-band 510 is decomposed into sub-bands 530, 535, 540 and 545 (third resolution), each sub-band being obtained by a "multidimensional filtering" operation, itself composed of several mono-dimensional filtering operations, each mono-dimensional filtering operation being applied by going through the sub-band to decompose parallel to one of the dimensions of the image, to apply the filtering to each sample of the image.

In FIG. 5, two letters "XY" are used to identify a combination of mono-dimensional filtering operations, which combination is also termed multidimensional filtering, the first letter in the notation, "X", indicating the type of filtering applied along the first dimension (for example the horizontal dimension, that is to say line by line) and in which the second letter, "Y", indicates the filtering applied along the second dimension (for example vertical, that is to say column by column). The letters "X" and "Y" may represent, for example, a type of high-pass mono-dimensional filter, denoted "H", or low-pass, denoted "L".

Preferably, a high-pass mono-dimensional filter H comprises downsampling in its direction of application. Similarly, a low-pas mono-dimensional filter L comprises downsampling in the direction of application of the filter. For example, the low-pass mono-dimensional filter L is low-pass convolutional filtering followed by downsampling by a factor of 2.

Thus, in FIG. 5, the letters "LH" written in sub-band 520 mean that, first of all, a low-pass filter is applied comprising downsampling by going through the sub-band row by row, then a high-pass filter comprising downsampling by going through the sub-band column by column.

When decomposition is carried out of an image into sub-bands, the four possible multidimensional filtering operations are thus represented by the pairs of letters "LL", "LH", "HL", and "HH". By considering the four possible multidimensional filtering operations so identified, four new sub-bands are produced. As each of the filtering operations comprises downsampling by a factor of two in its direction of application, that is to say vertically or horizontally, the sum of the numbers of samples of the new sub-bands so produced is equal to the number of samples of the initial sub-band, as illustrated in FIG. 5.

It is noted that one of the particular low-pass filters is constituted by a simple downsampling operation consisting of representing a plurality of pixels by a single pixel. It is to be recalled that there exist several downsampling methods. For example, the pixel resulting from the downsampling takes the value of one of the values of the pixels to represent. In another example, the pixel resulting from the downsampling takes the value of the mean of the values of the pixels to represent. Where the downsampling does not have an integer factor, it is possible, for example, to give the pixel resulting from the downsampling the value of a weighted average of the values of several pixels, certain initial pixels being represented by several pixels.

In the present invention, the downsampling operations implemented are, preferably, downsampling by an integer factor, for example representing two successive pixels, in the order of going through of the samples, by one pixel having as its value the value of one of the initial pixels or the mean of the values of the initial pixels.

Figure 4:
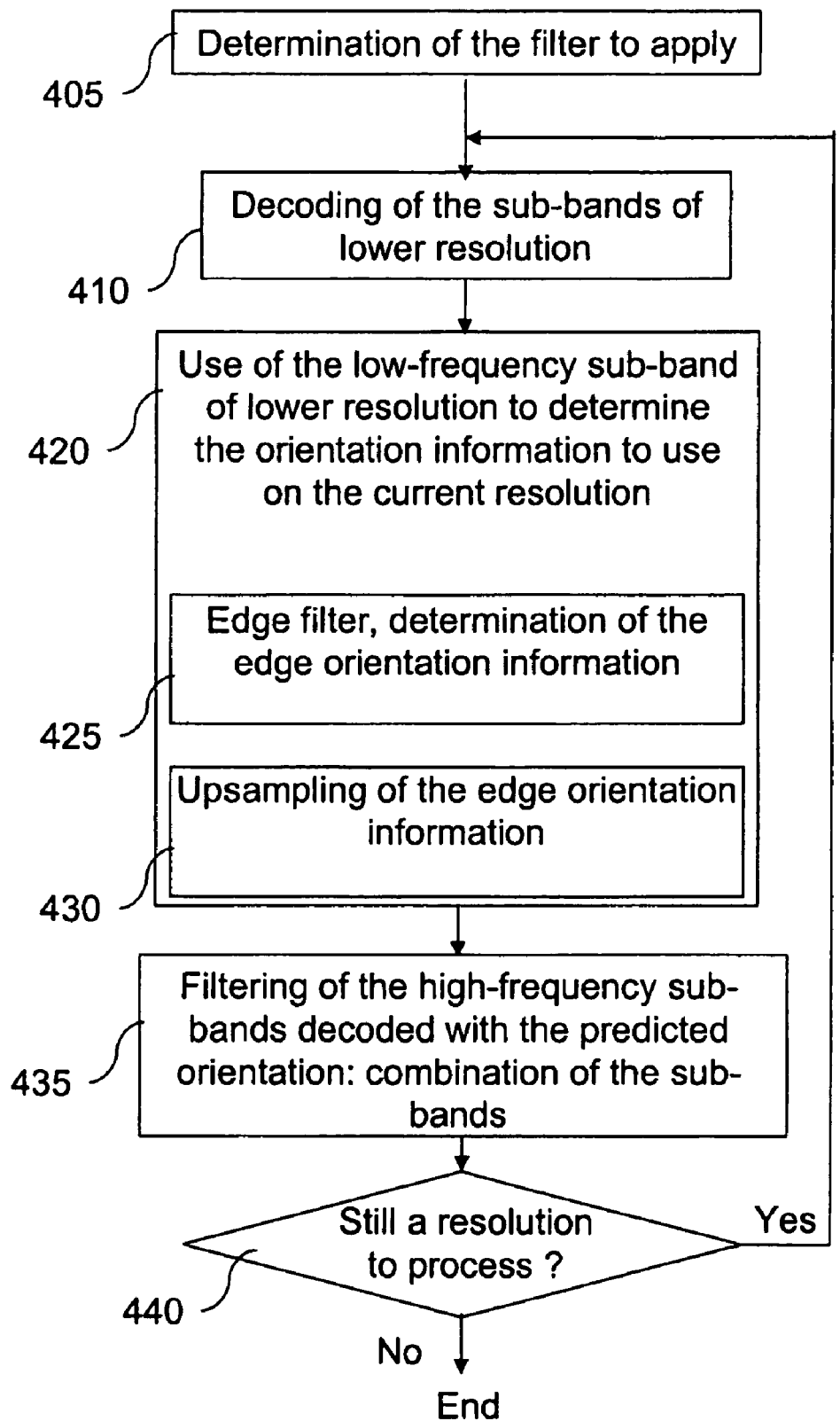
FIG. 4 is a representation, in the form of a logigram, of the steps implemented in a particular embodiment of the decoding method of the present invention.

FIG. 4 illustrates the decoding of an image which has been coded by implementing the coding method set forth with reference to FIG. 3. In the particular embodiment of the decoding method of the present invention illustrated in FIG. 4, a step 405 is first of all carried out which consists of using the information associated with the samples in order to identify the type of high-pass filter implemented on coding and the coefficients of that filter. In variants, step 405 is eliminated, the filters implemented on coding being known to the decoder.

Next step 410 is carried out consisting of decoding the tertiary signals or high-frequency sub-bands of lower resolution. During the first iteration of step 410, the secondary signal is also decoded. The decoding of each of these sub-bands is made using conventional methods such as Huffman's or arithmetic entropy decoding, and the scalar or vector dequantization of the samples and, the case arising, of the information associated with the coding of the samples, depending on the coding and quantization used by the coder.

Step 410 is followed by a step 420, during which an orientation calculation is made of each oriented filter used by the coder on the basis of the secondary signal. During this step 420, the sub-band SBED1 is used to predict the orientation to use to filter the high-frequency sub-bands of the same resolution as SBED1. The sub-band SBED1 is constructed either on the basis of the decoding of coded data presented in the compressed file (if the sub-band SBED1 corresponds to the lowest resolution of the signal), or on the basis of sub-band combination of resolution lower than the resolution of the sub-band SBED1.

As step 420, and its sub-steps 425 and 430, are strictly identical to step 320, and to its sub-steps 325 and 330, applied at the time of the coding, they are not described here. Step 420 thus produces an image SO0 containing the orientations to apply to each oriented filter and to each sample.

Next, during a step 435, inverse filtering of the sub-bands is carried out, by employing the orientations determined during step 420. Thus, the filtering is determined by the image SO0 containing the predicted orientation values. Next the current filtered sample is replaced by the value obtained for the sample having undergone the inverse filtering and the high-frequency sub-bands and the low-frequency sub-band of the current resolution are combined, to reconstitute the low-frequency sub-band of higher resolution constituting a quaternary signal except where the highest resolution is attained, in which case the quaternary image is the decoded image.

Next, during a step 440, it is determined whether any resolution to process remains. If yes, a new secondary signal is constituted from the quaternary signal obtained at the preceding iteration, and the steps 410 to 435 are repeated for the higher resolution to process. Otherwise, the initial image, in two or three dimensions, has been decoded in the form of the quaternary signal and the decoding method ends.

Figure 6:
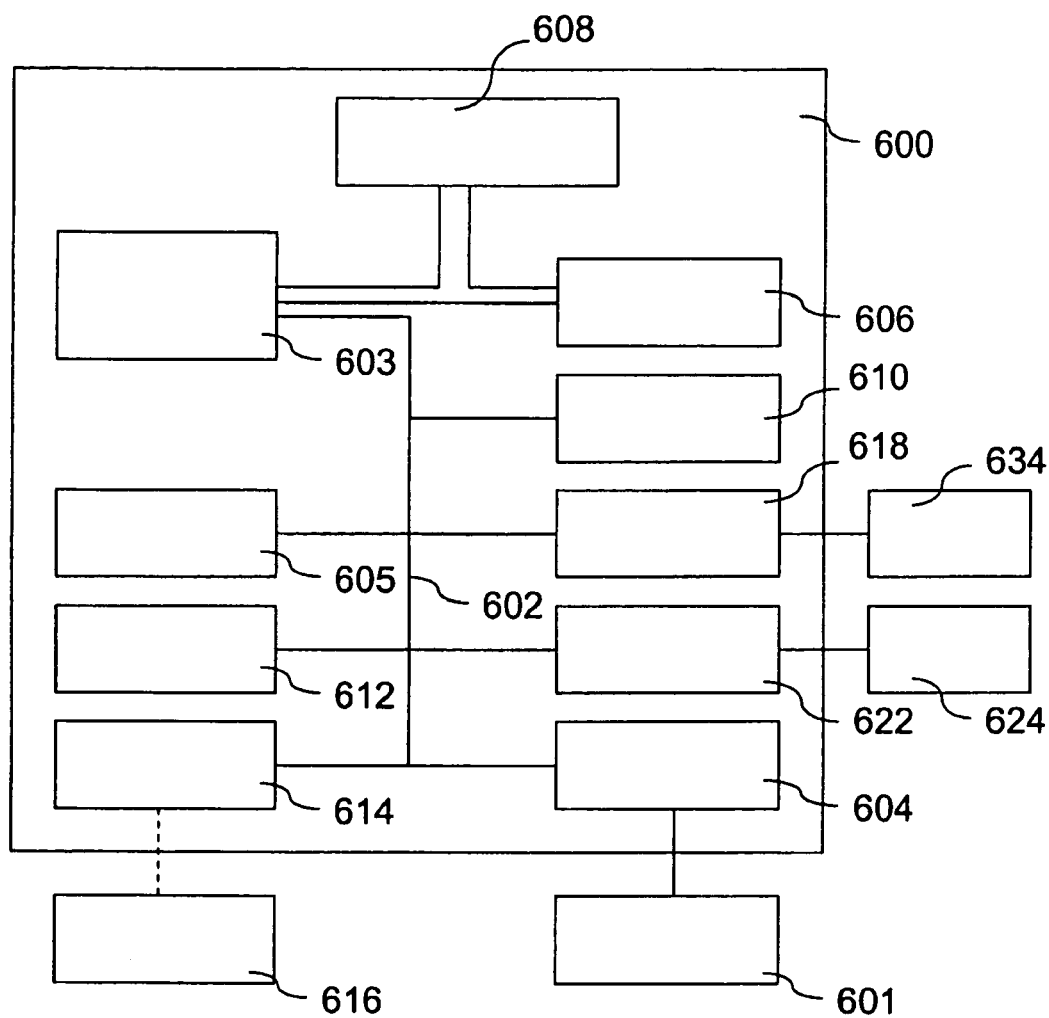

FIG. 6 shows a particular embodiment of the device of the present invention, coder and/or decoder 600, and different peripherals adapted to implement each aspect of the present invention. In the embodiment illustrated in FIG. 6, the device 600 is a micro-computer of known type connected, in the case of the coder, via a graphics card 604, to a means for acquisition or storage of images 601, for example a digital camera or a scanner, adapted to provide image information to compress.

The device 600 comprises a communication interface 618 connected to a network 634 able to transmit, as input, digital data to compress or decompress and, as output, data compressed or decompressed by the device. The device 600 also comprises a storage means 612, for example a hard disk, and a drive 614 for a diskette 616. The diskette 616 and the storage means 612 may contain data to compress or decompress, compressed or decompressed data and a computer program adapted to implement the method of coding or decoding of the present invention.

According to a variant, the program enabling the device to implement the present invention is stored in ROM (read only memory) 606. In another variant, the program is received via the communication network 634 before being stored.

The device 600 is, optionally, connected to a microphone 624 via an input/output card 622. This same device 600 has a screen 605 for viewing the data to be to compressed or decompressed or for serving as an interface with the user for parameterizing certain operating modes of the device 600, using a keyboard 610 and/or a mouse for example.

A CPU (central processing unit) 603 executes the instructions of the computer program and of programs necessary for its operation, for example an operating system. On powering up of the device 600, the programs stored in a non-volatile memory, for example the read only memory 606, the hard disk 612 or the diskette 616, are transferred into a random access memory RAM 608, which will then contain the executable code of the program of the present invention as well as registers for storing the variables necessary for its implementation.

Naturally, the diskette 616 may be replaced by any type of removable information carrier, such as a compact disc, memory card or key. In more general terms, an information storage means, which can be read by a computer or microprocessor, integrated or not into the device, and which may possibly be removable, stores a program of the present invention. A communication bus 602 affords communication between the different elements included in the device 600 or connected to it. The representation, in FIG. 6, of the bus 602 is non-limiting and in particular the central processing unit 603 unit may communicate instructions to any element of the device 600 directly or by means of another element of the device 600.

The device described here and, particularly, the central processing unit 603, may implement all or part of the processing operations described with reference to FIGS. 1 to 5, to implement each method of the present invention and constitute each device of the present invention.

The invention claimed is:

1. A method of coding a multidimensional digital signal (505), said signal comprising a plurality of samples denoted "initial", comprising:
  using a processor to perform the following:
  a step of determining at least one secondary signal representative of the complete multidimensional digital signal, each secondary signal having a lower number of samples than the number of samples of the multidimensional digital signal, said samples being obtained by a simple downsampling operation applied to the multidimensional digital signal;
  a step of determining filtering orientations on the basis of at least one secondary signal; and
  a step of determining at least one tertiary signal representing the signal to code, each tertiary signal having a lower number of samples than the number of initial samples, by implementing, on said multidimensional digital signal, filtering that is oriented on the basis of said filtering orientations.

2. A method according to claim 1, wherein during the step of determining a secondary signal, a low-pass filter and a downsampling operation are applied to the multidimensional signal.

3. A method according to any one of claims 1 to 2, wherein during the step of determining at least one tertiary signal, for each tertiary signal, a high-pass filter and a downsampling operation are applied to the multidimensional digital signal.

4. A method according to any one of claims 1 to 2, further comprising a step of coding the tertiary signals.

5. A method according to any one of claims 1 to 2, wherein during the steps of determining at least one secondary signal and of determining at least one tertiary signal, a decomposition into frequency sub-bands is implemented by applying filtering to the multidimensional signal to generate sub-bands corresponding to different frequencies.

6. A method according to claim 5, wherein said decomposition into frequency sub-bands employs the "lifting" technique.

7. A method according to any one of claims 1 to 2, wherein during the step of determining filtering orientations on the basis of at least one secondary signal, the secondary signal is reconstructed by implementing a coding and decoding simulation and the result of that simulation is used in order to obtain a version of the secondary signal that is identical to that available on decoding.

8. A method according to any one of claims 1 to 2, wherein during the step of determining filtering orientations on the basis of at least one secondary signal, a step of detecting the orientation of edges of the secondary signal is applied.

9. A device for coding a multidimensional digital signal, said signal comprising a plurality of samples denoted "initial", comprising:
  means for determining at least one secondary signal representative of the complete multidimensional digital signal, each secondary signal having a lower number of samples than the number of samples of the multidimensional digital signal, said samples being obtained by a simple downsampling operation applied to the multidimensional digital signal;
  means for determining filtering orientations on the basis of at least one secondary signal; and
  means for determining at least one tertiary signal representing the signal to code, each tertiary signal having a lower number of samples than the number of initial samples, by implementing, on said multidimensional digital signal, filtering that is oriented on the basis of said filtering orientations.

10. A device according to claim 9, wherein the means for determining filtering orientations on the basis of at least one secondary signal is adapted to apply detection of the orientation of edges of the secondary signal.

11. A device according to any one of claim 9 or 10, wherein the means for determining at least one secondary signal and for determining at least one tertiary signal are adapted to perform decomposition into frequency sub-bands by implementing the "lifting" technique.

12. A method of decoding data of a coded multidimensional digital signal representing coded samples, comprising:
  using a processor to perform the following:
  a step of determining at least one secondary signal representing the data of the coded multidimensional digital signal, each secondary signal having a lower number of samples than the number of coded samples;
  a step of determining filtering orientations on the basis of at least one secondary signal;
  a step of decoding at least one tertiary signal representing the data of the coded multidimensional digital signal, each tertiary signal having a lower number of samples than the number of initial samples; and
  a step of determining a quaternary signal representing the coded signal, on the basis of at least one tertiary signal, by implementing filtering oriented on the basis of said filtering orientations.

13. A method according to claim 12, wherein during the step of determining at least one secondary signal, the data of the coded multidimensional digital signal are decoded.

14. A method according to any one of claim 12 or 13, wherein said quaternary signal is implemented, as new secondary signal, in an iteration of the steps of said method.

15. A method according to any one of claims 12 to 13, wherein during each step of determining a quaternary signal, a simple upsampling operation is applied to at least one secondary signal.

16. A method according to any one of claims 12 to 13, wherein during each step of determining a quaternary signal, a low-pass filter and an upsampling operation are applied to at least one secondary signal.

17. A method according to any one of claims 12 to 13, wherein during each step of determining a quaternary signal, a recomposition into frequency sub-bands is implemented, on the basis of at least one secondary signal and at least one tertiary signal.

18. A method according to claim 17, wherein said recomposition into frequency sub-bands employs the "lifting" technique.

19. A method according to any one of claims 12 to 14, wherein during the step of determining filtering orientations on the basis of at least one secondary signal, a step of detecting the orientation of edges of the secondary signal is applied.

20. A device for decoding data of a coded multidimensional digital signal representing coded samples, comprising:
   means for determining at least one secondary signal representing the data of the coded multidimensional digital signal, each secondary signal having a lower number of samples than the number of coded samples;
   means for determining filtering orientations on the basis of at least one secondary signal;
   means for decoding at least one tertiary signal representing the data of the coded multidimensional digital signal, each tertiary signal having a lower number of samples than the number of initial samples; and
   means for determining a quaternary signal representing the coded signal, on the basis of at least one tertiary signal, implementing filtering oriented on the basis of said filtering orientations.

21. A device according to claim 20, wherein the means for determining filtering orientations on the basis of at least one secondary signal is adapted to apply detection of the orientation of edges of the secondary signal.

22. A device according to any one of claim 20 or 21, wherein the means for determining at least one secondary signal and for determining the quaternary signal are adapted to perform recomposition into frequency sub-bands by implementing the "lifting" technique.

23. A computer-readable medium having stored thereon a program that can be loaded into a computer system, said program containing instructions enabling the implementation of the coding method according to any one of claims 1 to 2, and/or the implementation of the decoding method according to any one of claims 12 to 13, when that program is loaded and executed by a computer system.

* * * * *